United States Patent
Iwami et al.

(10) Patent No.: US 6,699,587 B2
(45) Date of Patent: Mar. 2, 2004

(54) ROUGH SURFACE FINISHED METALLIC FOIL WITH GOOD CORRUGATION WORKABILITY AND CATALYST SUPPORT FOR EXHAUST GAS PURIFICATION

(75) Inventors: Kazutoshi Iwami, Tokyo (JP); Masayuki Kasuya, Tokai (JP); Shuji Nagasaki, Hikori (JP); Mikio Yamanaka, Futtsu (JP)

(73) Assignee: Nippon Steel Corporation, Tokyo (JP)

( * ) Notice: Subject to any disclaimer, the term of this patent is extended or adjusted under 35 U.S.C. 154(b) by 0 days.

(21) Appl. No.: 10/181,905

(22) PCT Filed: Dec. 26, 2000

(86) PCT No.: PCT/JP00/09269

§ 371 (c)(1),
(2), (4) Date: Jul. 19, 2002

(87) PCT Pub. No.: WO05/53669

PCT Pub. Date: Jul. 26, 2001

(65) Prior Publication Data

US 2003/0012974 A1 Jan. 16, 2003

(30) Foreign Application Priority Data

Jan. 20, 2000 (JP) ......................................... 2000-012179

(51) Int. Cl.$^7$ ............................. B32B 3/12; B01J 35/04; F01N 3/28
(52) U.S. Cl. ...................... 428/593; 428/606; 428/687; 502/527.22
(58) Field of Search ................................ 428/606, 687, 428/685, 593; 422/180; 502/527.22, 439

(56) References Cited

U.S. PATENT DOCUMENTS 4,331,631 A 5/1982 Chapman et al. ........... 422/180

FOREIGN PATENT DOCUMENTS

| EP | 0 115 412 A2 | 8/1984 |
| EP | 0 750 052 A1 | 12/1996 |
| EP | 0985450 A1 * | 3/2000 |
| EP | 0988892 A1 * | 3/2000 |
| EP | 1 046 723 A1 | 10/2000 |
| JP | 3-23309 | 1/1991 |
| JP | 08-038912 * | 2/1996 |
| JP | 09-099218 * | 4/1997 |
| JP | 09-192504 * | 7/1997 |
| JP | 10-309471 * | 11/1998 |

OTHER PUBLICATIONS

"Surface Texture (Surface Roughness, Waviness, and Lay)", American National Standard Institute/American Society of Mechanical Engineers, ANSI/ASME B46.1–1985, date of issuance—Apr. 30, 1986, pp. 1–7, 30–40.*

* cited by examiner

Primary Examiner—John J. Zimmerman
(74) Attorney, Agent, or Firm—Kenyon & Kenyon

(57) ABSTRACT

The present invention is: a metallic foil to be used for a metallic honeycomb for purifying exhaust gas of an automobile or the like, said metallic foil not causing cracks or ruptures to develop in the foil even when it undergoes corrugation work with more sharply bending corner portions of a trapezoidal shape; and a catalyst support for purifying exhaust gas of an automobile or the like, characterized in that said metallic foil, being rough surface finished and having good corrugation workability, is made of heat-resistant stainless steel and has surface roughness more than 2.0 and not more than 5.0 μm in $R_{max}$ and, said metallic catalyst support for purifying exhaust gas has a structure comprising a honeycomb inserted in a jacket, wherein the honeycomb is composed of rough surface finished metallic foil having surface roughness more than 2.0 and not more than 5.0 μm in $R_{max}$ and the jacket is made of heat-resistant stainless steel.

2 Claims, 5 Drawing Sheets

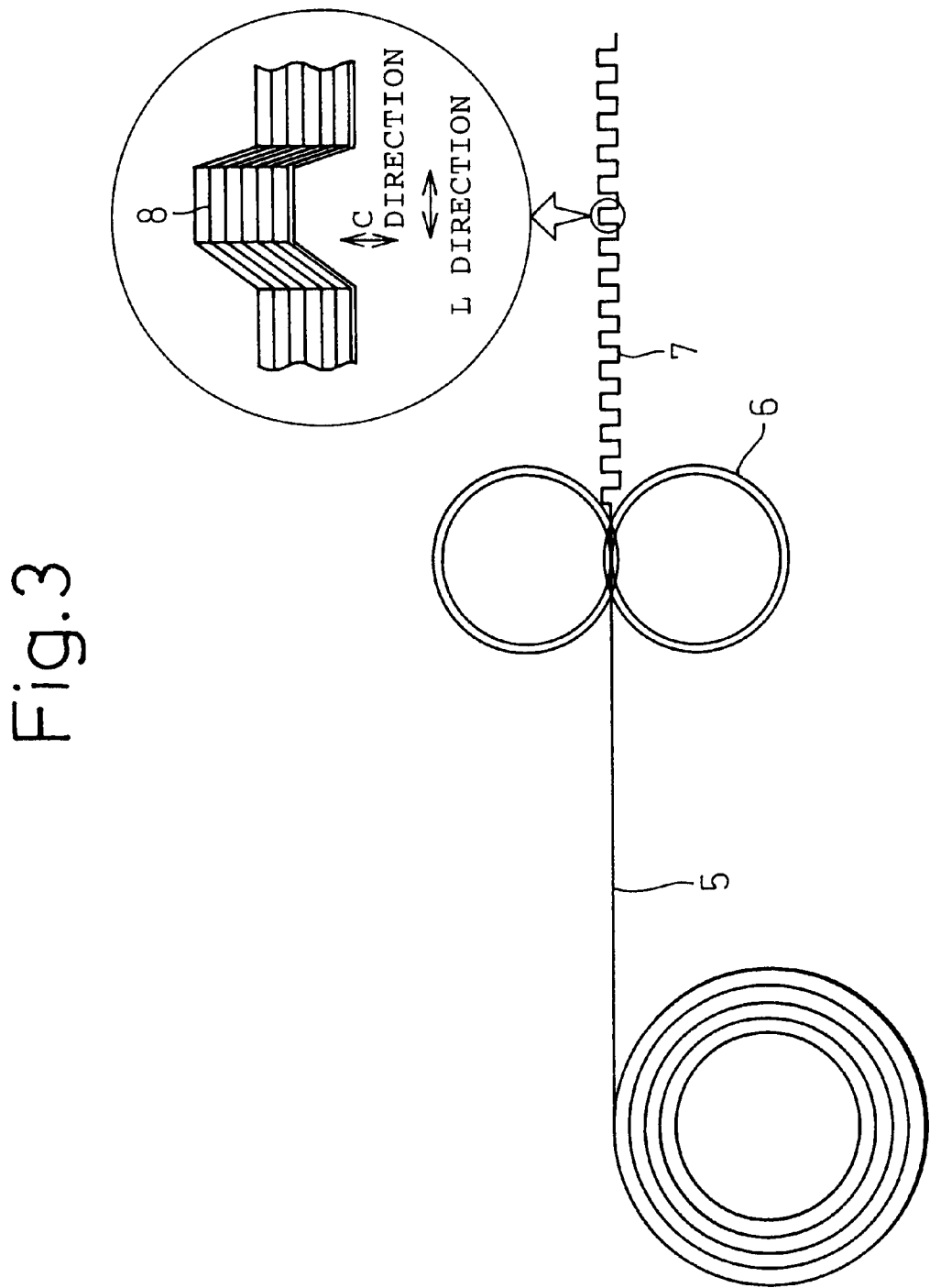

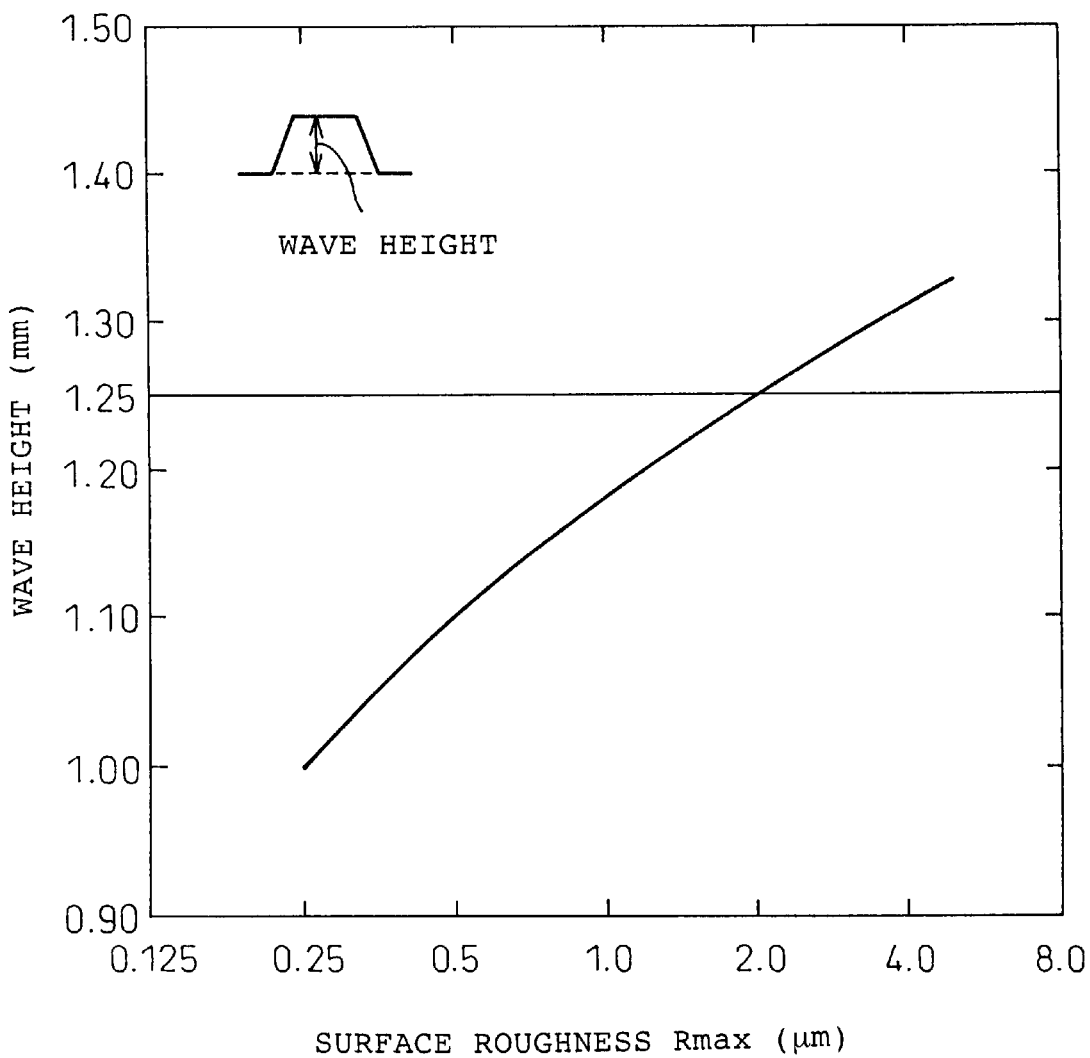

ROUGH SURFACE FINISHED METALLIC FOIL WITH GOOD CORRUGATION WORKABILITY AND CATALYST SUPPORT FOR EXHAUST GAS PURIFICATION

TECHNICAL FIELD

The present invention relates to a metallic foil for a metallic honeycomb used as a catalyst support, or the like, for purifying the exhaust gas of an automobile, a motorcycle or the like, and to a catalyst support for exhaust gas purification made by using the metallic foil.

BACKGROUND ART

In recent years, with the tightening of automobile exhaust gas regulations, metallic honeycombs used in place of conventional ceramic honeycombs form a gradually increasing proportion of the honeycombs used as catalyst supports for exhaust gas purification. This is because a metallic honeycomb having a wall thickness thinner than that of a ceramic honeycomb is excellent in early-stage purification capacity since it quickly rises in temperature when an engine starts from a cold state and has further advantages such as low exhaust resistance.

As for the structure of a metallic honeycomb, a metallic foil of Fe—Cr—Al steel having a thickness of 15 to 50 μm is corrugated into a sinusoidal wave shape, a triangular wave shape, a trapezoidal wave shape or the like, and the corrugated sheet is laid on top of a flat sheet, or on top of another corrugated sheet, to form a rectangular parallelepiped-shaped structure, or these are wound together to form a cylindrical structure, a racetrack-shaped structure or the like, and any of these is used as the structure of a metallic honeycomb. This metallic honeycomb is inserted into a jacket made of heat-resistant stainless steel to form a catalyst support (metallic support) for exhaust gas purification. Also, a metallic honeycomb, wherein the corrugated sheet and the flat sheet, or the corrugated sheet and the other corrugated sheet, are joined to each other at all or some of their overlapping portions is used.

However, a metallic honeycomb thus formed by using a sinusoidal wave-shaped corrugated sheet forms acute-angled open spaces 4 in the proximity of a contact point of the sinusoidal wave-shaped corrugated sheet 2 with a flat sheet 1 as shown in FIG. 1 and causes a catalytic substance 3 composed of γ-alumina, precious metal catalyst particles, a co-catalyst, etc. to penetrate deep into the spaces. The portions of the catalytic substance having penetrated into the spaces do not contribute in substance to a catalytic reaction since they are 20 μm or more distant from the surfaces of the catalytic substance directly touching the flow of engine exhaust gas, which is a shortcoming causing a waste of the expensive precious metal catalyst.

For this reason, a trapezoidal corrugated sheet 2 has recently been required wherein the trapezoidal shape has corner portions bent more sharply, in corrugation work of a foil, as shown in FIG. 2. This is because the use of a trapezoidal corrugated sheet can diminish the spaces formed in the proximity of a contact point of the trapezoidal corrugated sheet 2 with a flat sheet 1 and thus reduces the amount of useless portions of a catalyst not contributing to a catalytic reaction.

As for a manufacturing method of a trapezoidal corrugated sheet, it can be manufactured by rotating a pair of toothed rolls in mesh and passing a flat foil between the toothed rolls, as disclosed in Japanese Unexamined Patent Publication No. H8-257412, for example.

However, when a conventional metallic foil undergoes the corrugation work of bending the corner portions of a trapezoidal shape more sharply, a problem arises that cracks or ruptures frequently develop during the work and thus the productivity is considerably lowered.

DISCLOSURE OF THE INVENTION

The object of the present invention is, in view of the above problem, to provide a metallic foil, to be used for a metallic honeycomb for purifying the exhaust gas of an automobile or the like, not causing cracks or ruptures to develop in the foil even when the metallic foil undergoes corrugation work of bending the corner portions of a trapezoidal shape more sharply, and to provide a catalyst support for purifying exhaust gas of an automobile or the like made by using the metallic foil.

The present inventors studied the cause of cracks or ruptures developing in a metallic foil during corrugation work and have found that the prevention of cracks or ruptures developing in a metallic foil during corrugation work can be achieved by adjusting the surface roughness of the metallic foil. The present invention has been completed on the basis of the finding and the gist of the present invention is as follows:

(1) A rough surface finished metallic foil with good corrugation workability, which metallic foil is made of heat-resistant stainless steel and is used for a catalyst support for exhaust gas purification, characterized by having surface roughness in an as rolled or after being polished state of not less than 3.2 μm and not more than 5.0 μm in $R_{max}$.

(2) A catalyst support for exhaust gas purification having a structure configured by inserting a honeycomb formed of a metallic foil made of heat-resistant stainless steel into a jacket made of heat-resistant stainless steel, characterized in that said metallic foil is a rough surface finished metallic foil having surface roughness in an as rolled or after being polished state of not less than 3.2 μm and not more than 5.0 μm in $R_{max}$.

BRIEF DESCRIPTION OF THE DRAWINGS

FIG. 3 is a schematic view showing corrugation work of a foil.

FIG. 6 is a graph showing a relationship between the surface roughness of foils and the wave height in trapezoidal corrugation work.

BEST MODE FOR CARRYING OUT THE INVENTION

The present invention will be explained in detail hereafter.

The present invention is characterized in that, out of the metallic foils used for forming a metallic honeycomb, a metallic foil to be used as a corrugated sheet, in particular, is adjusted so as to have a rough surface finish, and the rough surface finished metallic foil has surface roughness not less than 3.2 μm and not more than 5.0 μm in $R_{max}$, as specified in JIS (B0601-1970). Such a metallic foil can be obtained, for example, by cold-rolling it with mill rolls polished to #80 or less in abrasive grain size number, or by polishing the surfaces of a foil, after it is rolled, with a belt sander of the above-mentioned grain size number, as specified in the JIS standard.

In addition, as a metallic foil made of heat-resistant stainless steel according to the present invention, suitable is, for example, a metallic foil: containing 18–25% Cr, 4.5–6.0% Al, and if necessary, small amounts of one or more elements selected from among V, Ti, Nb, Zr, Hf, Y, Ce, La, and other rare earth elements, and the balance substantially consisting of Fe; and having sufficient heat resistance to a high-temperature exhaust gas from an engine. However, a commonly used material can be employed.

Figure 4A:
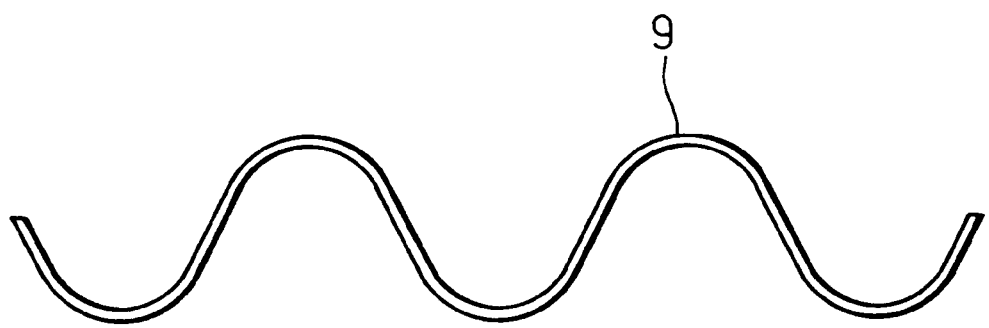
FIG. 4(*a*) is a schematic view showing a sinusoidal wave-shaped corrugated sheet and FIG. 4(*b*) is a schematic view showing a trapezoidal wave-shaped corrugated sheet.

A metallic foil according to the present invention has surface roughness not less than 3.2 μm and not more than 5.0 μm in $R_{max}$ which is remarkably increased as compared with the surface roughness 0.2 to 0.3 μm in $R_{max}$ of a usual rolled foil. As shown in FIG. 3, foil corrugation work is conducted by passing a metallic foil 5 of increased surface roughness 8 through a gap between the tooth forms of two meshing toothed rolls 6, thereby forming a corrugated sheet 7. In the case of a conventional corrugated sheet 9 having a sinusoidal wave shape as shown in FIG. 4(a), even a conventional metallic foil having surface roughness 0.2 to 0.3 μm in $R_{max}$ has not caused cracks to develop during corrugation work as long as an appropriate lubricant is used at the same time.

An Fe—Cr—Al-containing heat-resistant stainless steel foil used for a catalyst support for purifying exhaust gas of an automobile or the like, is poor in ductility as a material itself, because it is designed as an alloy capable of withstanding a high-temperature exhaust gas. Therefore, when slippage between tooth forms and a metallic foil is inhibited, the foil material does not enter between the tooth forms fully meshing with each other and the tooth forms just before those, thus causing cracks or ruptures to frequently develop especially in a direction (C direction) perpendicular to the rolling direction (L direction) of the metallic foil as shown in FIG. 3.

Figure 4B:
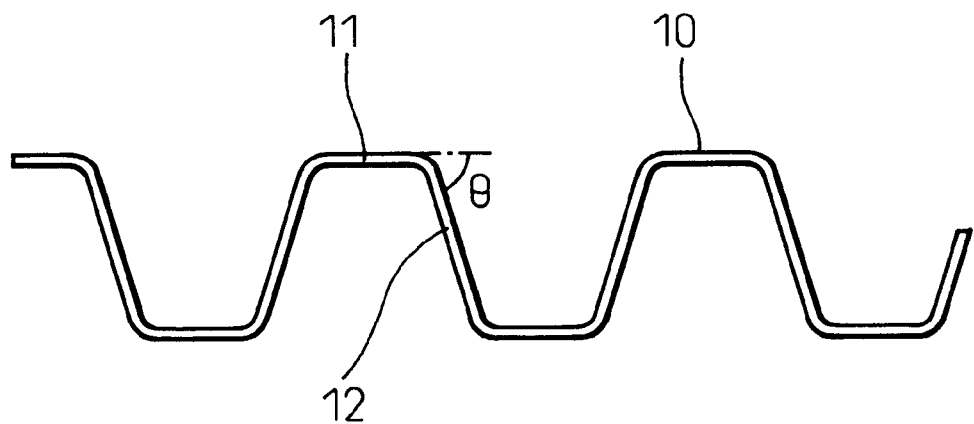

On the other hand, a metallic foil according to the present invention can store a lubricant in recessed portions on the foil as the surface roughness thereof is remarkably increased. As a result, the lubricant is held between the projections/recesses (roughness or enevenness) on the foil and tooth forms during the corrugation work, and ensures slippage between the metallic foil and the tooth forms during the corrugation work. For this reason, the metallic foil according to the present invention does not cause cracks or ruptures to develop even when the foil is corrugated into a trapezoidal wave shape with corner portions each having a small radius of curvature as shown in FIG. 4(b). Here, as the lubricant, it is desirable to use a liquid lubricant; however, a solid lubricant, a mixture of a liquid lubricant and a solid one, or the like, can be used as well. As a trapezoidal corrugated sheet according to the present invention, suitable is a trapezoidal corrugated sheet wherein at least a flat portion on each of the tops 11 of the corrugated sheet and another flat portion on each of the oblique sides 12 thereof are disposed, and, at a bent portion between the neighboring two flat portions, the foil thickness center line is bent, for example, at a bending angle θ of 65° C. or more with a radius of curvature not more than three times the foil thickness, as shown in FIG. 4(b).

Next, the reason why the surface roughness of a metallic foil according to the present invention is restricted will be explained hereafter.

Figure 5:
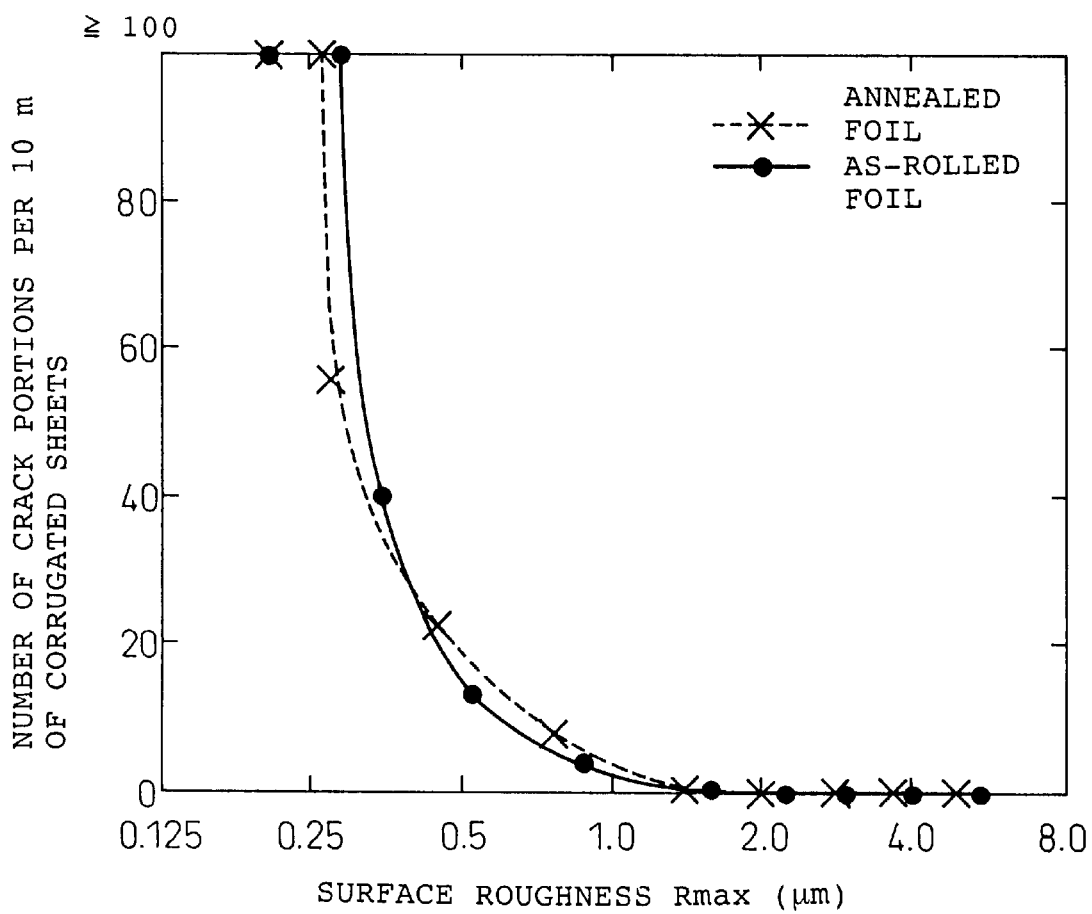
FIG. 5 is a graph showing relationships between surface roughness and the number of portions cracked during trapezoidal corrugation work.

FIG. 5 is a graph made by plotting the number of cracked portions per 10 m of each corrugated sheet, for annealed foils and as-rolled foils, correspondently to the surface roughness of the foils, in a case where foils made of 20% Cr-5% Al heat-resistant stainless steel 30 μm in thickness are prepared so as to have various levels of surface roughness by adjusting the surface roughness of mill rolls, half the amount of each foil is annealed in a bright annealing furnace, and these are corrugated into trapezoidal wave-shaped corrugated sheets as shown in FIG. 4(b).

As shown in FIG. 5, no cracks develop in the annealed foils and the as-rolled foils during corrugation work when they have surface roughness more than 2.0 μm in $R_{max}$. Although the annealed foils have material ductility to some extent, their tensile strength is lower than that of the as-rolled foils, and they lack, to that extent, in an ability to pull the foil material between two neighboring tooth forms. It seems that this causes the merit of ductility to be canceled by the demerit of lowered strength, and the annealed foil and the as-rolled foil show substantially the same trend in crack development.

That is to say, the present invention can be applied to both an annealed foil and an as-rolled foil. Further, a trapezoidal corrugated sheet used for a catalyst support for purifying exhaust gas of an automobile or the like is, in some cases, required to have a wave height of at least 1.25 mm or more in order to effectively exhibit the function of a catalyst supported thereon and to reduce a pressure loss of an exhaust gas in the catalyst support by ensuring passages for the exhaust gas. The present inventors, however, have found that, when the wave height of a trapezoidal corrugated sheet is increased, cracks tend to develop in the foil during corrugation work because of an increased degree of working.

Therefore, the present inventors made a research on a relation between the surface roughness of foils and the height of corrugation which serves as a condition for preventing cracks or ruptures from developing during trapezoidal corrugation work. FIG. 6 is a graph showing a relation between the surface roughness of foils and the maximum permissible height of worked corrugations when 30 μm thick foils made of 20% Cr-5% Al heat-resistant stainless steel were corrugated into a trapezoidal wave shape. As shown in FIG. 6, cracks develop in foils in an area over the curve showing the relation between the surface roughness of foils and the height of corrugation. Accordingly, it has been found that corrugation work into a wave height of 1.25 μm or more can be carried out without causing cracks to develop if only the surface roughness exceeds 2.0 μm in $R_{max}$. Namely, the use of metallic foils with surface roughness exceeding 2.0 μm in $R_{max}$ allows corrugation work to be carried out for forming trapezoidal wave shapes with wave heights ranging from low to high.

According to the present invention, the lower limit of surface roughness of foils is specified to be more than 2.0 μm in $R_{max}$; this is because surface roughness less than 2.0 μm in $R_{max}$ causes cracks or ruptures to develop when a foil material is corrugated into a trapezoidal wave shape. On the other hand, the upper limit of surface roughness in $R_{max}$ is defined to be 5.0 μm; the reason is that, if surface roughness exceeds 5.0 μm, a defective shape such as warping or waving is induced during foil rolling to impair productivity, and projections/recesses (roughness or unevenness) becomes excessively large for a foil material 20 to 30 μm in thickness, as frequently used these days, thereby causing deterioration in oxidation resistance.

Further, a metallic foil of a remarkably roughened surface finish, like a metallic foil according to the present invention, has advantages, such as good wettability with a binder used for adhering a brazing powder in brazing, improved adhesiveness to γ-alumina that supports a precious metal catalyst, good fluidity to a wash coat because of the roughened surfaces without causing the wash coat to form any bridge in a space (meniscus), an ability to increase the surface area of the supported catalyst, and an ability to increase the purifying capacity, as disclosed in Japanese Unexamined Patent Publication No. H3-23309.

Figure 1:
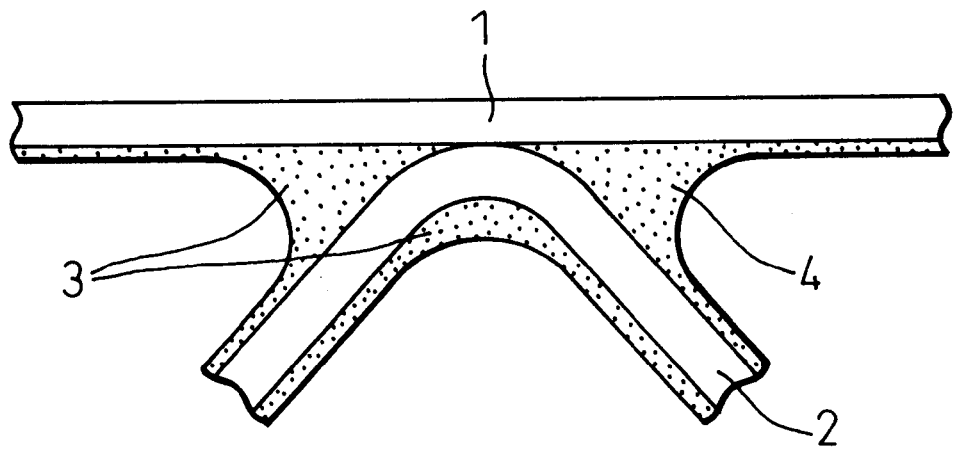
FIG. 1 is a schematic view showing a honeycomb formed by using a sinusoidal wave-shaped corrugated sheet.
Figure 2:
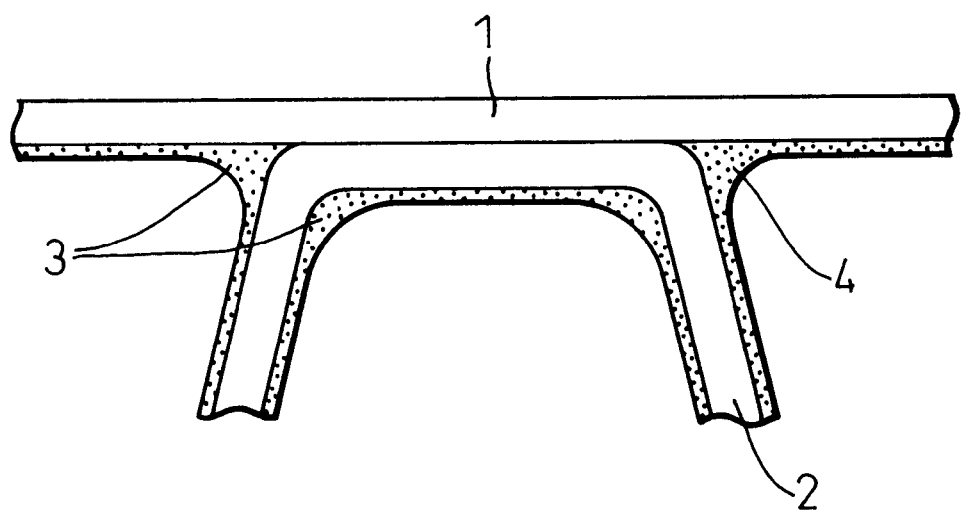
FIG. 2 is a schematic view showing a honeycomb formed by using a trapezoidal wave-shaped corrugated sheet.

As stated above, a metallic foil according to the present invention can be corrugated, without causing cracks or ruptures to develop, into a wave shape near a trapezoidal wave shape with its corner portions each having a small radius of curvature. In a catalyst support for purifying exhaust gas of an automobile or the like using a metallic foil according to the present invention as a corrugated sheet of a trapezoidal wave shape, acute-angled open spaces (menisci) 4 formed in the proximity of a contact point between a flat sheet and the corrugated sheet can be made very small, compared with a case where a corrugated sheet of a sinusoidal wave shape is used, as shown in FIGS. 1 and 2 and, further, as the metallic foil of increased surface roughness is used, when the flat sheet 1 and the corrugated sheet 2 are joined to each other by brazing, a molten brazing filler material can easily flow owing to a capillary phenomenon produced by the projections and recesses (roughness or unevenness) on the surfaces of the metallic foil and a phenomenon in which the brazing filler material unnecessarily juts out into the spaces 4 by a surface tension and forms bridges, can be reduced. Because of this, brazing can be performed with a small amount of expensive brazing filler material. Further, since acute-angled open spaces (menisci) 4 hardly exist, substantially the whole of supported catalytic substance contributes to a catalytic reaction with exhaust gas, the expensive precious metal catalyst can be more effectively utilized, and the catalyst support can be provided with high purification capacity for the exhaust gas.

The present invention, however, does not exclude the use of a rough surface finished metallic foil defined by the present invention as a corrugated sheet in sinusoidal wave shape, etc. This is because, even when used as a corrugated sheet in sinusoidal wave shape, etc., a rough surface finished metallic foil can exhibit the effects of the present invention, such as: good wettability with a binder in brazing, good brazing capability with a small amount of brazing filler material, which are the advantages intrinsic to a rough surface finished metallic foil when brazing is applied, good wash coating capability, or an ability to increase the surface area of a supported catalyst and an ability to increase the purification capacity for exhaust gas.

EXAMPLES

Examples of the present invention will be described hereafter.

Example 1

A coiled as-rolled foil 45 kg in weight (about 2,200 m long) made of 20% Cr-5% Al steel, having a thickness of 30 μm, a width of 90 mm and surface roughness of 3.2 μm in $R_{max}$ and a coiled annealed foil 32 kg in weight (about 1,600 m long), having the same dimensions as the above except surface roughness of 2.6 μm in $R_{max}$ were each corrugated into a trapezoidal wave shape having a wave height of 1.25 mm as shown in FIG. 4(b) while a lubricant is spread over both the surfaces of the foil. As a result, the former could be worked into a corrugated sheet about 1,400 m long and the latter into one about 1,000 m long without causing any cracks to develop at all.

Apart from this, an as-rolled foil having the same dimensions as the above except surface roughness of 0.3 μm in $R_{max}$ and an annealed foil having the same dimensions as the above except surface roughness of 0.3 μm in $R_{max}$ were corrugated likewise; however, because cracks frequently developed, the work was suspended halfway to replace the tooth forms with those of a sinusoidal wave shape and the corrugation work into a sinusoidal wave shape shown in FIG. 4(a) was continued.

Example 2

The as-rolled foil ($R_{max}$: 3.2 μm) corrugated into a trapezoidal wave shape in Example 1 and a flat sheet of the same as-rolled foil were put one on the other and wound into a honeycomb, and inserted into a jacket 87 mm in diameter, 1.5 mm in thickness, and 931 mm in length made of 19% Cr steel. The jacket, the corrugated sheet, and the flat sheet were partly vacuum-brazed to each other to make a metallic support, and thus five metallic supports were prepared. In the same way, the as-rolled foil ($R_{max}$: 0.3 μm) corrugated into a sinusoidal wave shape in Example 1 was used to make five metallic supports.

The ten metallic supports were each wash-coated with γ-alumina and a co-catalyst, and made to support a precious metal catalyst mainly composed of Pt and Pd under the completely same conditions.

The amount of wash coat and that of precious metal catalyst of each metallic support calculated from the weight increase of each metallic support caused by the supported catalyst were 150 g/l and 15 g/l, respectively, on the average for the five metal supports corrugated into a trapezoidal wave shape. In contrast, the amount of wash coat and that of precious metal catalyst were 200 g/l and 20 g/l, respectively, on the average for the five metal supports corrugated into a sinusoidal wave shape. Comparing the two cases with each other, it is understood that both the amount of wash coat and that of precious metal catalyst are larger in the latter case. This is chiefly caused by the amounts thereof having penetrated into the acute-angled open spaces formed on both sides of the contact point of the flat sheet with the sinusoidal wave-shaped corrugated sheet.

A cone and a flange, both made of stainless steel, were welded to the jacket of each metallic support having completed supporting the catalyst, and each metallic support was placed just after an exhaust manifold of a 4-cylinder gasoline engine of 1,600 cc.

The engine was started in a cold state, loaded so as to output 15 HP at 2,500 rpm after 15 seconds of idling, and the purification percentage of hydrocarbon in exhaust gas was measured 300 seconds after the starting of the engine.

As a result, the purification percentage of hydrocarbon in the exhaust gas was 90.4% on the average for the five metallic supports corrugated into a trapezoidal wave shape while it was 89.6% on the average for the five metal supports corrugated into a sinusoidal wave shape; that is to say, the purification percentages were substantially the same for the two cases.

Accordingly, it was ascertained that a metallic support corrugated into a trapezoidal wave shape according to the present invention, comparing with a metallic support corrugated into a sinusoidal wave shape, could reduce the amount of expensive wash coat and that of precious metal catalyst by about 20% or more, respectively, and could achieve cost reduction, although the purification percentages of hydrocarbon in an exhaust gas in both cases were substantially identical.

INDUSTRIAL APPLICABILITY

As stated above, a metallic foil according to the present invention used for forming a honeycomb has a surface roughness formed by a remarkably roughened surface finish as compared with a usual rolled foil having roughness of 0.2 to 0.3 μm in $R_{max}$, and therefore it can be corrugated into a trapezoidal wave shape with its corner portions bent so as to have a small radius of curvature. A metallic support using such a corrugated sheet makes it possible to utilize an expensive precious metal catalyst more effectively, as useless portions of the supported catalytic substance, that do not take part in a catalytic reaction, are reduced. Further, by using a metallic foil according to the present invention, both as a corrugated sheet and as a flat sheet, the wettability of a binder used for adhering a brazing filler material is improved and a brazing structure can be formed more reliably. Also, remarkable effects are produced including the improved wettability of γ-alumina directly supporting a catalyst and an ability to cause a catalytic substance to be deposited on a metallic support so as to be more uniform in thickness from its upper portions to its lower portions.

What is claimed is:

1. A rough surface finished metallic foil with good corrugation workability, which metallic foil is made of heat-resistant stainless steel and is used for a catalyst support for exhaust gas purification, characterized by having surface roughness in an as rolled or after being polished state of not less than 3.2 μm and not more than 5.0 μm in $R_{max}$.

2. A catalyst support for exhaust gas purification having a structure configured by inserting a honeycomb formed of a metallic foil made of heat-resistant stainless steel into a jacket made of heat-resistant stainless steel, characterized in that said metallic foil is a rough surface finished metallic foil having surface roughness in an as rolled or after being polished state of not less than 3.2 μm and not more than 5.0 μm in $R_{max}$.

* * * * *